May 7, 1940. A. W. FRANZMEIER 2,199,698
MILK STRAINER
Filed March 3, 1937 3 Sheets-Sheet 1
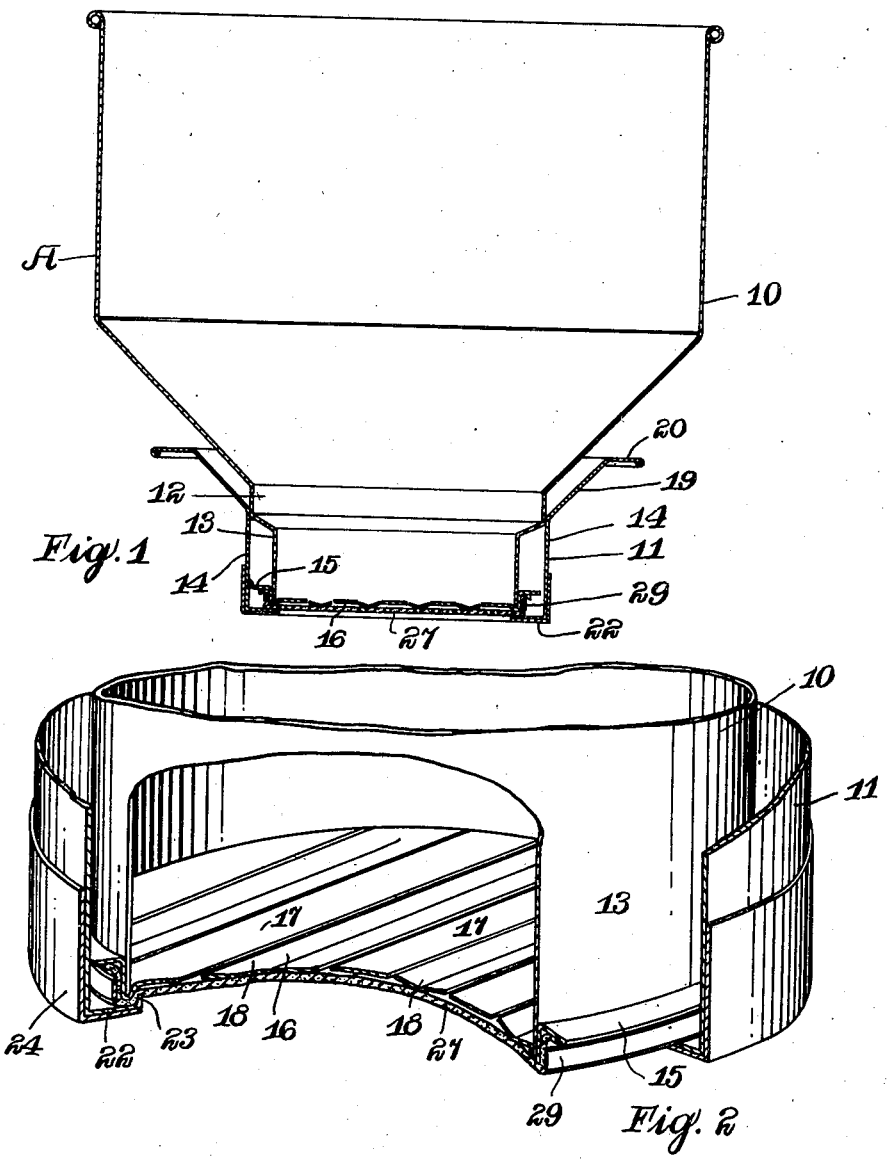
Inventor
Alvin W. Franzmeier
By Howard L. Lizelz
Attorney

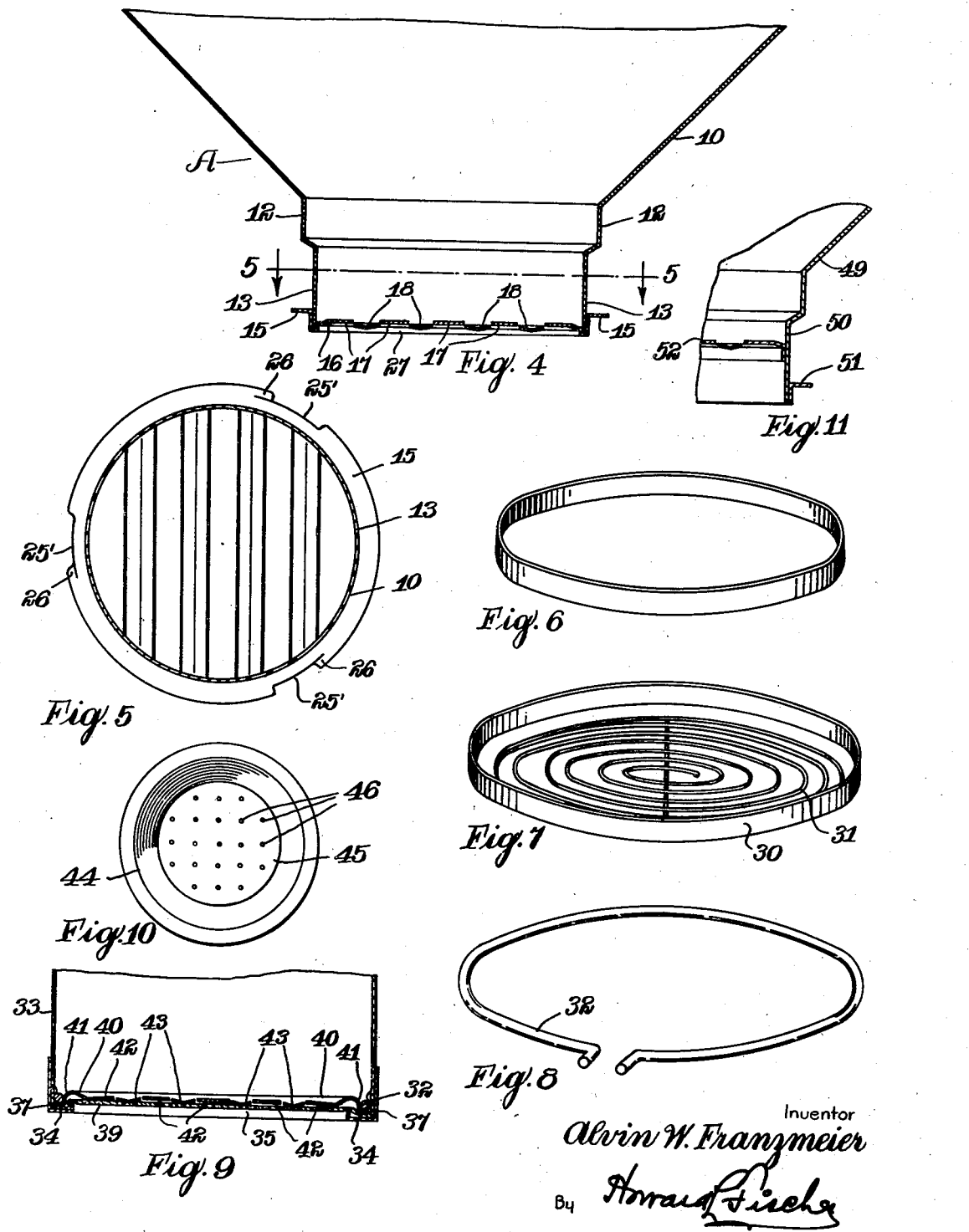

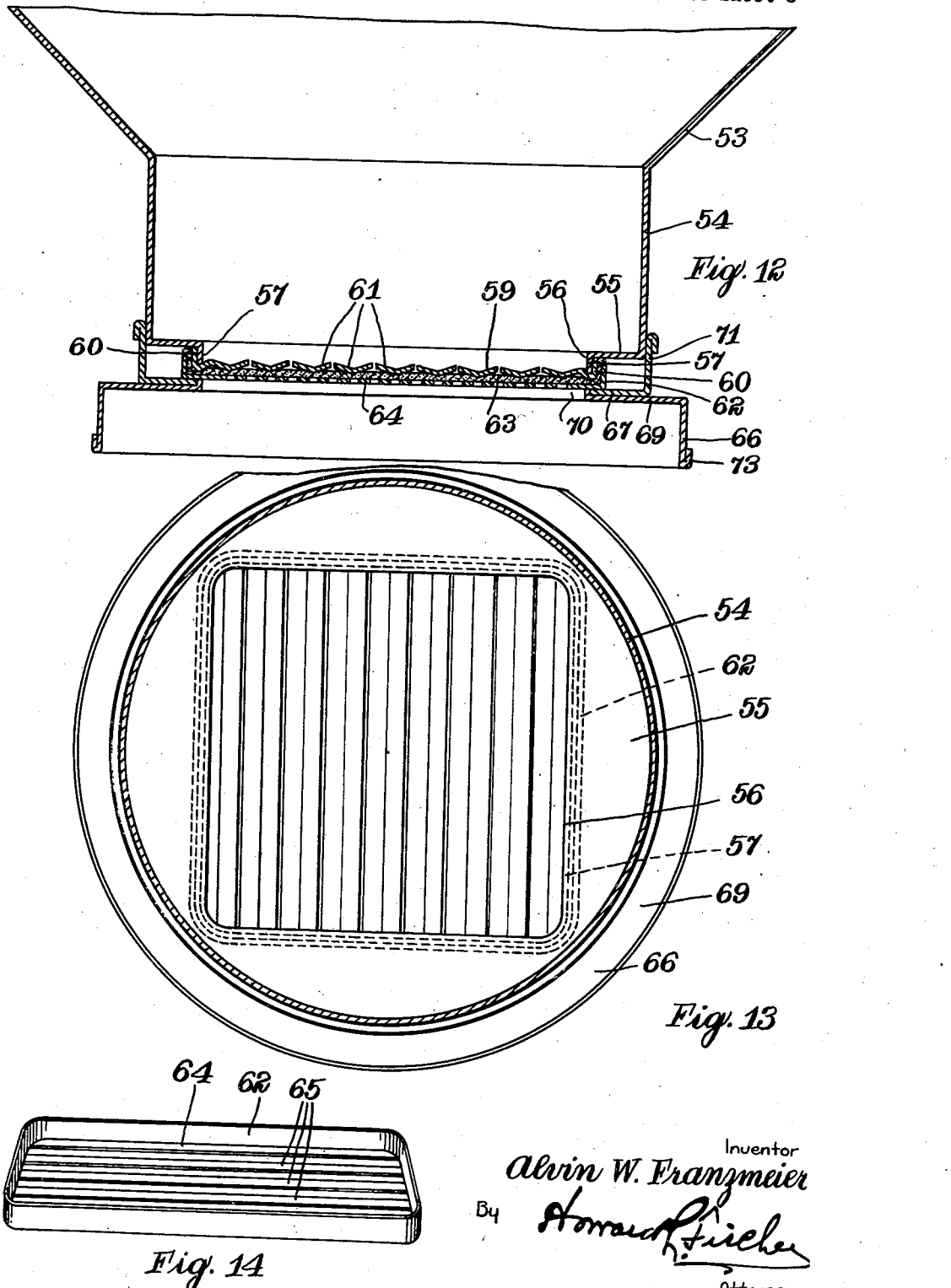

Patented May 7, 1940

2,199,698

UNITED STATES PATENT OFFICE 2,199,698

MILK STRAINER

Alvin W. Franzmeier, Rosemount, Minn., assignor of one-fourth to Howard L. Fischer, St. Paul, Minn.

Application March 3, 1937, Serial No. 128,774

11 Claims. (Cl. 210—159)

My invention relates to an improvement in milk strainers of a type particularly designed to facilitate the changing of strainer cloths or pads and to provide a more sanitary construction than has previously been thought possible.

It has been common practice in the past to strain liquids such as milk, through specially prepared cloths or filter pads clamped in the lower ends of strainers. In order to remove these pads, it is necessary to pour any remaining milk out of the strainer, to reach into the strainer and disengage the locking means holding the pad in place, and to remove this locking means and pad, and replace the pad. It may be seen that this action takes place while the inside surface of the strainer is moistened by milk and when the hands engage this moistened surface, the walls of the strainer are apt to pick up dirt from the hands of the operator. Furthermore, the pad changing operation often takes place while the strainer is still resting upon the strained milk receptacle, so that when the pad is removed, any sediment on the walls of the strainer run down the walls and drip into the strained milk receptacle.

It is the purpose of my invention to provide a strainer which is so devised that the strainer cloth or pad may be changed without touching any portion of the strainer which has been or which will be in contact with the milk. Even if the operator straining the milk is not careful to keep his hands properly clean, there will be no danger of contamination of the milk. The pads cannot be changed while the strainer is resting upon the milk receptacle and accordingly the strained milk cannot become contaminated by the changing operation.

It is a feature of my invention to provide a strainer equipped with a separate cup shaped element and to clamp the straining pad between the strainer and this separate cup. It is also a feature of my invention to secure the straining cloth or pad over the lower extremity of the straining member which is removably secured within the cup. In order to clamp the straining cloth or pad to this main portion of the strainer, it is desirable to turn the strainer upside down during the changing operation, thereby allowing any sediment on the walls of the strainer to flow out through the open top end thereof. It is only necessary for the operator to engage the straining pad and the strainer on the outer surface thereof, over which no milk should pass during the straining operation, thereby avoiding all danger of milk contamination during the straining operation.

It is a feature of my invention to provide a novel type of baffle plate for the milk, which comprises a series of strips which are slightly separated to permit the milk to flow therebetween. These strips are designed in a manner to prevent the weight of the milk from resting upon the filter pad positioned therebeneath, and to allow only an even flow of liquid on to this filter pad. The baffle plate is so devised as to prevent washing of the filter pad and to prevent the flow of liquid in any direction from wearing the filter pad thin in any particular place.

It is a feature of my invention to provide a strainer construction in which the filter pad is securely locked in position and cannot work loose even when the strainer is shaken to cause the milk to flow more quickly therethrough. The filter pad is locked peripherally to the lower portion of the strainer. The strainer is then placed within a receiving cup which bears against the filter by the weight of the milk within the strainer to lock the filter pad. In addition a locking means is provided between the strainer and the receiving cup to hold these elements together. The upturned flange on the receiving cup engages the filter pad to hold the same from being displaced. Accordingly it is not an easy matter to release the strainer pad until it is desired to do so.

These and other objects and novel features of my invention will be more clearly and fully set forth in the following specification and claims.

In the drawings forming a part of my specification:

Figure 1 is a vertical cross-sectional view through my strainer illustrating the construction thereof.

Figure 2 is a perspective view of the lower extremity of the receiving cup and strainer, parts of which have been broken away to illustrate the construction thereof.

Figure 3 is a vertical section through the center of my straining cup.

Figure 4 is a vertical section centrally through the lowermost extremity of the strainer.

Figure 5 is a sectional view of the lower portion of my strainer as it would appear if cut along the line 5—5 in Figure 4.

Figure 6 is a perspective view of one type of clamping ring for securing the filter pad to the lower extremity of the strainer.

Figure 7 is a perspective view of a slightly different type of clamping bar illustrating a support to extend beneath the filtering medium.

Figure 8 illustrates a spring clamping ring which may be used for holding the filter pad in position.

Figure 9 illustrates in vertical section, a slightly different construction of strainer employing a baffle plate similar to that disclosed in the strainers previously shown.

Figure 10 illustrates a slightly modified form of strainer receiving cup.

Figure 11 discloses a different form of strainer in which the bottom is raised from the lowermost strainer end.

Figure 12 discloses my construction as it may be applied to a strainer adapted for use with square straining pads.

Figure 13 is a section along the line 13—13 of Figure 12.

Figure 14 is a perspective view of a clamping ring to be used with the strainer of Figures 12 and 13.

My strainer comprises a staining receptacle 10 in somewhat the general shape of a funnel or the like, which fits within a separable receiving cup 11. The straining receptacle 10 is sufficiently large at the top to contain a considerable quantity of milk or other liquid to be strained, and is restricted in size at 12 to properly fit within the strained milk receptacle into which the strainer A is ordinarily inserted. The diameter of the strainer receptacle 10 is further restricted at 13 to space the same from the vertical walls 14 of the receiving cup 11. As best illustrated in Figure 4 of the drawings, the receptacle 10 is provided near its lowermost extremity with a circumferential flange 15 which engages suitable projections on the receiving cup 11 to lock the members 10 and 11 securely together in a manner which will be later described in detail. The strainer receptacle 10 is provided with a bottom 16 which is secured integrally to the vertical portion 13, and which is composed of a series of strips 17 between which are interposed a second series of strips 18. In preferred form, the bottom 16 is formed in one piece and the adjacent strips 17 and 18 are formed merely by providing slits in the bottom 16. In the form of construction shown, the strips 17 are flat and are raised slightly above the normal upper surface of the bottom 16. The strips 18 are slightly trough shaped in configuration and are positioned somewhat lower than the strips 17. The milk is guided by the strips 18 passing through the slots between the strips 17 and 18 to flow against the lower surface of the strips 17, the force of the milk being substantially horizontal at this point. As the milk flows under each strip 17 into opposite directions, the force causing the flow is neutralized and the milk drops on to the filter pad with little or no tendency to wash horizontally over the surface of the pad. In this way, the applicant has found that even extremely thin paper straining pads may be used without injury thereto.

The receiving cup 11 is provided as has been stated, with a substantially cylindrical portion 14 which flares outwardly at 19 terminating in a horizontally extending portion 20 surrounded by a reinforcing bead 21. The horizontal portion 20 engages the top of the strained milk receptacle, supporting the strainer thereupon. The lower extremity of the cylindrical portion 14 terminates in an inwardly extending flange 22. About the inner edge of this flange 22, I provide an upstanding edge 23 which engages into the material forming the filter pad to hold the pad firmly engaged. A reinforcing ring 24 is shown surrounding the lower portion of the receiving cup 11.

Inwardly extending projections 25 which are inclined with respect to the bottom flange 22, are formed projecting inwardly from the inner surface of the cylindrical portion 14 of the cup 11. These projections 25 are for the purpose of locking the strainer receptacle 10 in engagement therewith. The projections 24 engage the circumferential flange 15 of the strainer receptacle when the receptacle 10 is in engagement with the cup 11. The flange 15 is provided with notches 25' through which the projections 24 may pass when the receptacle 10 is being placed into engagement with the cup 11 and the flange 15, a portion 26 adjacent each notch 25' is inclined slightly to be properly engaged by the projections 24. In inserting the strainer receptacle 10 into the receiving cup 11, the member 10 is rotated within the cup 11 until the projections 24 coincide with the notches 25', whereupon the member 10 drops downwardly into engagement with the edge 23 of the flange 22. By slightly rotating the member 10 with respect to the member 11, the inclined projections 24 are wedged into engagement with the portions 26 of the flange 15, thereby locking the members 10 and 11 securely together.

The filter pad 27 is locked into engagement with the lower extremity of the member 10 by means of a ring 29. This ring 29 is of just sufficient size to squeeze the pad 27 tightly against the lower extremity of the member 10. When it is desired to use filter pads 27 formed of paper or other material which has little structural strength, it is desirable to provide a ring as illustrated in Figure 7 of the drawings. This ring 30 is provided with a grid bottom made in the form of a spiral 31 of wire, the convolutions of which are spaced apart to allow milk to flow freely therebetween.

Figure 8 discloses a slightly different type of clamping ring construction. The ring 32 illustrated in Figure 8 is a split spring ring which must be expanded slightly in order to fit about the filter pad, and which when allowed to contract, holds the filter pad snugly against the bottom of the member 10 under spring tension.

Figure 9 discloses my baffle plate used in conjunction with the usual type of strainer. In this modification, the lower extremity of the strainer 33 is provided with an inwardly extending flange 34 having an upstanding edge 35 similar to the formation of the lower portion of the receiving cup 11. A baffle plate 36 is equipped with a bearing edge 37 which extends below the remainder of the baffle plate to clamp a filter pad 39 against the flange 34. An upstanding bead 40 just within the bearing edge 37 connects this edge 37 to the intermediate portion of the plate. Openings 41 are provided through the bead 40 on the outer surface thereof, adjacent the edge 37 to permit milk outside of the bead 40 to pass through the baffle. The bottom portion of the baffle plate within the bead 40 is devised into series of strips 42 and alternate strips 43. The strips 43 are slightly trough shaped throughout the greater portion of their length and are separated slightly from the strips 42 to permit liquid to pass therebetween. As the force of the liquid passing through the baffle is substantially equalized in all directions, there is little tendency for the liquid to wash through the filter pad 39.

In Figure 10, I disclose a strainer receiving cup 44 adapted to receive the strainer receptacle 10. This cup 44 is to be substituted for the cup 11 of Figures 1 and 2. Where paper or other similar thin straining material is used to form the straining medium, it is often advantageous to use in combination with the clamping ring 30 embodying the spiral support 31, the receiving cup disclosed in Figure 10. This receiving cup 44 is provided with a bottom 45 having a relatively small number of holes 46 therethrough. The milk is thus drawn away slowly from beneath the strainer element, thus providing a cushion or a choking action which prevents the milk from flowing too swiftly through the straining element and injuring the same. The bottom 45 is spaced below the support 31, but the milk upon the bottom 45 acts to check the flow of milk through the strainer pad to some extent.

In Figure 11 of the drawings, I disclose a strainer construction which differs slightly from the construction illustrated in Figure 4. This strainer comprises a receptacle 49 similar to the straining receptacle 10, and is provided with a restricted portion 50 similar to the portion 12. A flange 51, similar to 15, provides a locking and guiding means.

Secured within the restricted portion 50, I have provided a bottom 52, similar to the bottom 16, but spaced upwardly from the lowermost part of the restricted portion 50. It has been found that when the bottom 52 is properly spaced above the pad, the pad will not wash.

The manner in which my construction may be applied to a strainer to accommodate square type strainer pads is shown in Figures 12, 13 and 14. In this construction, the strainer 53 is provided with a restricted portion 54 provided with a bottom 55. A square opening 56, having downwardly depending flanges 57 along the edges thereof, is formed in the bottom 55. A square bottom 59 is provided with upwardly extending peripheral flanges 60 which are secured to the flanges 57, to secure the bottom 59 to the strainer 53. The bottom 59 is formed of a series of slightly spaced trough shaped members 61, or may be as shown in Figures 2, 4, or 9.

A clamping ring 62, square to fit about the marginal edges of a square pad 63 clamped to the bottom of the strainer 53, is provided for holding the square pad 63 in place. As in the round type of strainer previously described, the ring 62 may be merely in the form of a band of metal similar to that of Figure 6, but square. In the Figures 12, 13 and 14, the ring 62 is formed with a bottom 64, and is used with pads with insufficient body to support themselves. As will be noted in Figure 12, the pad 63 is clamped between the bottom 64 on the ring 62, and the bottom 59. The trough shaped members 61 clamp the pad 63 along parallel lines against the bottom 64 holding the same against washing.

The bottom 64 may be perforated or slotted in any desired manner. Figure 14 shows the bottom 64 made of spaced parallel bars 65, which preferably extend at right angles to the members 61 on the bottom 59 when in place.

When the strainer opening is square, the type of receiving cup illustrated in Figures 12 and 13 is preferably used. The receiving cup 66 comprises a pair of plates 67 and 69 secured together, and provided with central openings 70. The upper plate 67 is provided with an upstanding circular flange 71 adapted to accommodate the strainer 53. The lower plate 69 is provided with a depending circular flange 73 adapted to extend about the top edge of a milk can.

While no locking means is shown in combination with this square type of strainer, the previously described locking means or any other suitable locking means between these members could be used.

My new funnel is extremely low in cost and simple to manufacture. It comprises but few parts which may be readily assembled in manufacture. The milk receptacle and the receiving cup are secured together by a locking means which has been described and the filter pad is securely locked between these two elements. The baffle is simple and effective and the entire baffle may be formed from a single sheet of material. My strainer is accordingly deemed to be a forward step in the art.

In accordance with the patent statutes, I have described the principles of operation and construction of my strainer and while I have endeavored to set forth the best embodiments thereof, I desire to have it understood that these are only illustrative of a means of carrying out my invention and that obvious changes may be made within the scope of the following claims without departing from the spirit of my invention.

I claim:

1. A strainer comprising a milk receiving receptacle and a receiving cup for said receptacle, said receptacle including a bottom having openings therethrough, a strainer pad adapted to extend beneath said bottom, means for clamping said strainer pad in position, and means on said receiving cup to clamp said strainer pad between said receiving cup and said receptacle.

2. A strainer comprising a strainer receptacle and a cooperating receiving cup therefor having an inturned flange upon which said receptacle may rest, said receptacle including a filter pad, means for clamping said filter pad to said receptacle, and means on said receptacle cooperable with said receiving cup to hold the same together.

3. A strainer comprising a receptacle, a bottom thereupon, said bottom comprising a series of spaced flat strips, said flat strips having alternated therebetween, substantially trough shaped strips.

4. A strainer comprising a receptacle having a bottom, said bottom comprising a series of trough shaped strips which are relatively wide and have therebetween relatively narrow passages.

5. A strainer baffle plate comprising a series of spaced strips and a series of substantially trough shaped strips alternately arranged between said first mentioned strips.

6. A strainer comprising a milk receiving receptacle, a bottom thereon, openings in said bottom, a filter pad extending beneath said bottom, clamping means encircling said pad and the bottom of said receptacle and removably clamping the same together for clamping said filter pad to said receptacle, and a perforated bottom on said clamping means upon which said filter pad is supported, and means on said bottom of said receptacle for clamping said strainer pad at spaced points against said bottom of said clamping means, said points extending a fraction of the area of the unperforated portion of said bottom.

7. A strainer including a milk receiving receptacle, a bottom therein, a filter pad extending beneath said bottom, means removably encircling the pad for clamping said filter pad to said receptacle and supported thereby, a bottom in said clamping means through which milk may pass, said bottom in said receptacle being relatively free from said pad over the greater portion of the bottom area, but including means engaging said filter pad along spaced lines to clamp the filter pad against said bottom on said clamping means.

8. A strainer comprising a milk receiving receptacle, a downwardly extending collar forming a part of said receptacle, a filter pad extending beneath said collar, a flexible band extending around the marginal edge of said pad clamping the edge of said pad to said collar, and means disengageably secured to said receptacle and movable with respect to said band for holding said band in encircling position.

9. A strainer comprising a milk receiving receptacle, a substantially cylindrical lower end on said receptacle, a strainer pad extending under said lower end having marginal edges overlying said cylindrical lower end, a band encircling the said marginal pad edges, frictionally holding said pad in place, and means releasably secured to said receptacle and movable with respect to said band for holding said band in encircling position.

10. A strainer comprising a milk receiving receptacle, a substantially cylindrical bottom portion on said receptacle, having opening means therethrough, a strainer pad underlying the receptacle bottom and including marginal edges overlying said cylindrical bottom portion, and a flexible endless band removably securing said pad to said receptacle, said band frictionally engaging over said marginal pad edges.

11. A strainer including a straining receptacle, a bottom on said receptacle including a substantially flat plate having substantially parallel slits therein dividing said plate into a series of strips, alternate of said strips all contacting one horizontal plane and the remaining of said strips lying in a parallel horizontal plane spaced apart from said one horizontal plane.

ALVIN W. FRANZMEIER.